United States Patent

[11] 3,580,608

| [72] | Inventor | Charles Clark Simpson Grant Kempston, Bedford, England |
|---|---|---|
| [21] | Appl. No. | 790,634 |
| [22] | Filed | Jan. 13, 1969 |
| [45] | Patented | May 25, 1971 |
| [73] | Assignee | Ibbett Engineering Company Limited Bedford, England |
| [32] | Priority | Jan. 19, 1968 |
| [33] | | Great Britain |
| [31] | | 2,946/68 |

[54] TRAILER TOWING ARRANGEMENT
5 Claims, 2 Drawing Figs.

[52] U.S. Cl. .................................................. 280/405,
188/112, 280/489
[51] Int. Cl. ....................................................... B60d 1/16
[50] Field of Search ........................................... 280/405,
406, 489; 188/112, 142

[56] References Cited
UNITED STATES PATENTS

| 2,385,253 | 9/1945 | Black | 280/405, |
| 2,396,576 | 3/1946 | Kelly | 280/405 |
| 2,599,993 | 6/1952 | Hill et al. | 280/405 |
| 2,786,554 | 3/1957 | Yadro | 188/142X |
| 2,954,104 | 9/1960 | Shumate | 188/112 |

FOREIGN PATENTS

| 996,200 | 8/1951 | France | 280/405 |
| 1,407,799 | 6/1965 | France | 280/489 |
| 835,262 | 3/1952 | Germany | 280/489 |
| 917,353 | 8/1954 | Germany | 289/489 |

Primary Examiner—Kenneth H. Betts
Attorney—William Anthony Drucker

ABSTRACT: The towing arrangement for attachment to a vehicle having two pairs of parallel arms having pivotal mountings at each end for connection at one end to a vehicle and at the other end to a tow body housing thereby forming a wishbone arrangement converged towards the housing. A connector which fits a coupling on another vehicle is attached to the tow body housing. A spring or hydraulic element is provided between the vehicle and the paris of parallel arms to exert an upward force on the latter.

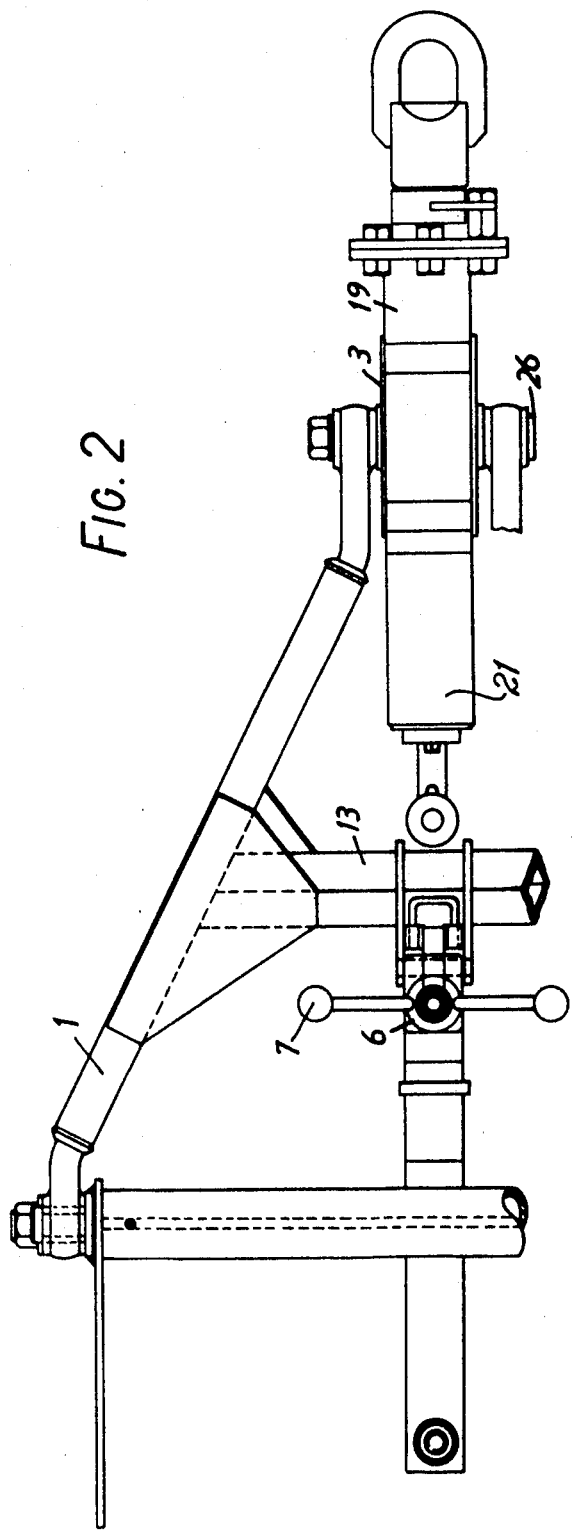

TRAILER TOWING ARRANGEMENT

BACKGROUND OF THE INVENTION

This invention relates to a towing arrangement for attachment to a vehicle and serving particularly but not solely for towing trailers having four wheels, i.e. close coupled wheels in tandem.

Where a towing eye is positioned at a substantially fixed height the four wheeled trailer attached thereto is acted upon by forces transmitted through the trailer chassis which tend to lift either the front or rear pair of wheels clear of the ground. Such lifting can increase the tendency of the trailer to swing or to jackknife.

An object of the invention is to provide a towing arrangement in which the towing eye or other connecting member has a varying height according to the loading and/or ground undulation.

SUMMARY OF INVENTION

A towing assembly for attachment to a vehicle, comprising
a. a first pair of parallel arms adapted at one end for pivotal mounting on a vehicle.
b. a second pair of parallel arms adapted at one end for pivotal mounting on a vehicle.
c. a tow body housing pivotally connected with said first and second pairs of parallel arms at their other ends to form a wishbone arrangement of said arms the arrangement being convergent towards the tow body housing.
d. a coupling means connected with the tow body housing which coupling means is held in a level position by means of said parallel arms.
e. spring means for connection between said vehicle and said upper arms adapted to provide a restricted pivotal movement of said first and second parallel arms in both directions relative to said vehicle whereby excess movement of the coupling means is prevented.

BRIEF DESCRIPTION OF DRAWINGS

A constructional form of the invention mounted on a trailer for attachment to a towing vehicle will now be described by way of example with reference to the accompanying drawing in which:

FIG. 2 is a part plan view.

DESCRIPTION OF PREFERRED EMBODIMENT

Figure 1:
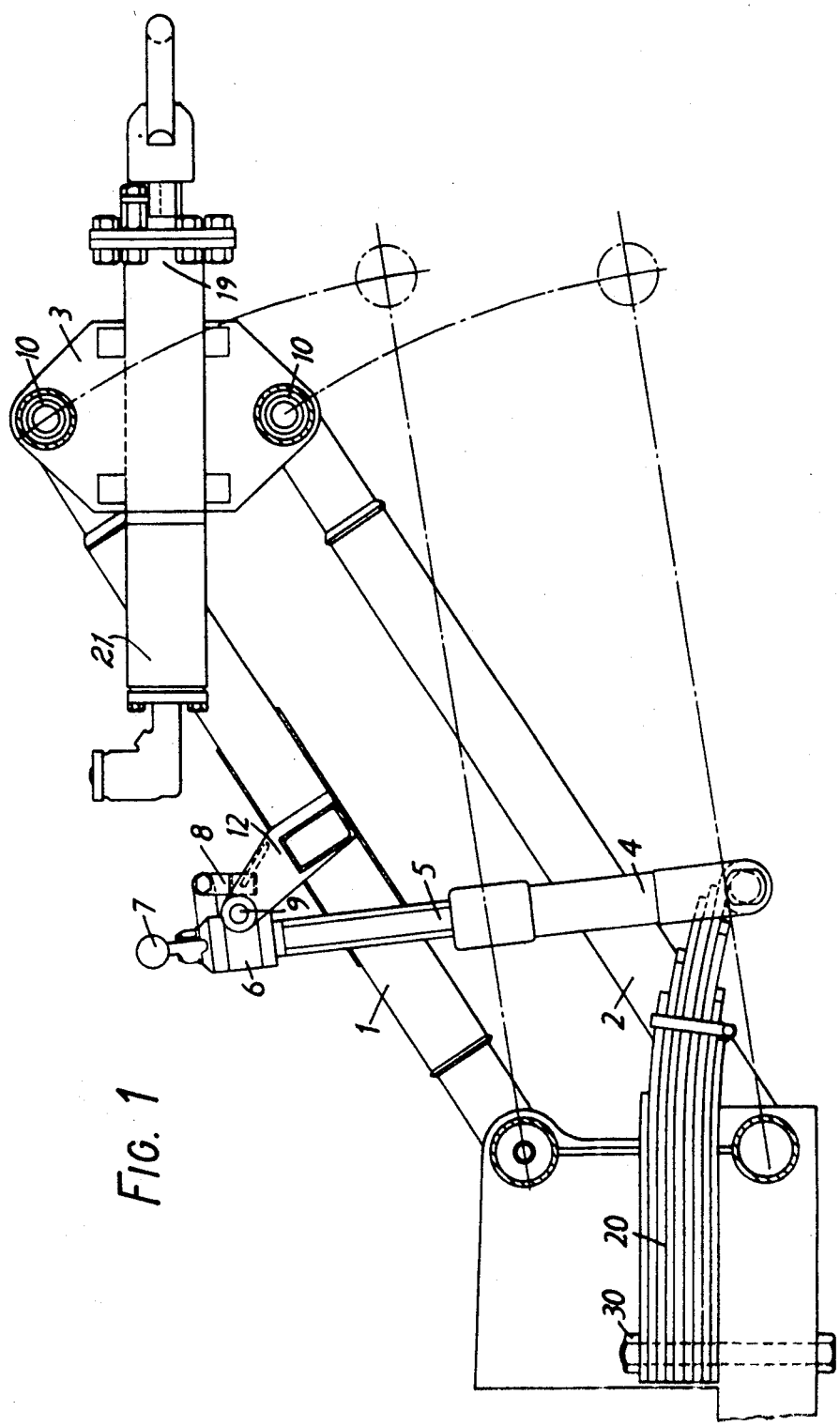
FIG. 1 is a longitudinal section through the towing arrangement of the invention.

A pair of arms or top tow brackets 1 are pivotally mounted on two parallel plates at the rear end of the chassis of the towing vehicle. Similarly, a pair of bottom tow brackets 2 are pivotally mounted on the vehicle chassis below the bracket. The brackets 1, 2 are cranked to give a wishbone appearance in plan view and are pivotally connected at their ends remote from the chassis mounting to a tow body housing 3. The latter comprises a pair of parallel and spaced-apart plates and upper and lower tubes connected between the plates and serving to receive bushes 10 through which pass anchor pins 26.

The pivots of the brackets are all arranged on the form points of a parallelogram when viewed in elevation (see FIG. 1).

Mounted in the tow body housing 3 between the two plates thereof is a tow coupling 19 having a towing eye at the rear end thereof. The coupling contains a spring element tending to force the towing eye rearwardly and also a hydraulic master cylinder 21 pressured by the towing eye in the event of overrun of the trailer during braking of the towing vehicle, which cylinder in turn feeds a hydraulic brake line to operate the brakes on the trailer.

Between the upper brackets 1 there is provided a cross tie 13 which supports a suspension anchor 6 on a pin 9 passing through brackets 12. A screw 5 passes through the anchor 6 and into a nut 4 mounted at one end of a leaf spring 20 carried by the trailer chassis and fixed there by means of a bolt 21 and nut 30. The nut is pivotally connected to the leaf spring by a pin 11. The upper end of the screw 5 is provided with a handle 7 which carries a screw lock 8 which in its locking position is between the brackets 12 carrying the suspension anchor 6.

Instead of providing a screwjack connection between the brackets and the leaf spring a hydraulic jack could be provided. As a further alternative a coil spring could be provided between the chassis and the brackets.

The leaf spring maintains an upward force on the brackets this preventing the latter from effecting downward movement with the vehicle and trailer stationary.

The height of the towing assembly can be adjusted by means of the screwjack according to the height of the trailer as it is loaded. These variable towing heights are accommodated within set limits by the assembly which allows for a flexible variation between the vehicle and trailer when moving over undulating surfaces.

Since the height of the towing eye is variable no lifting of the front or rear wheels occurs with the result that the trailer becomes more stable and easily controllable and thus safer.

The sudden upward jerks of the chassis are damped by the leaf spring and likewise the latter accommodates the upward jerks of the trailer.

The towing assembly is also suitable for towing two-wheel trailers and is also suitable for mounting on a towing vehicle as opposed to a trailer whereby the attachment is adjustable for towing trailers having different heights of towing connector. The spring or hydraulic element may be adjustable according to the loading of the trailer.

We claim:
1. A towing assembly for attachment to a vehicle, comprising
   a. a first pair of parallel arms adapted at one end for pivotal mounting on a vehicle.
   b. a second pair of parallel arms adapted at one end for pivotal mounting on a vehicle.
   c. a tow body housing pivotally connected with said first and second pairs of parallel arms at their other ends to form a wishbone arrangement of said arms the arrangement being convergent towards the tow body housing.
   d. a coupling means connected with the tow body housing which coupling means is held in a level position by means of said parallel arms.
   e. spring means for connection between said vehicle and said upper arms adapted to provide a restricted pivotal movement of said first and second parallel arms in both directions relative to said vehicle whereby excess movement of the coupling means is prevented.

2. A towing assembly according to claim 1, wherein there is provided adjustable means between said spring means and said upper arms whereby the height of said connector may be adjusted.

3. A towing assembly according to claim 2, wherein the adjustable means between said spring means and said upper arms comprises a screwjack.

4. A towing assembly according to claim 2, wherein the adjustable means between said spring means and said upper arms is a hydraulic jack.

5. A towing assembly according to claim 1, wherein there is provided a hydraulic master cylinder connected between the tow body housing and the coupling which master cylinder is adapted to provide a fluid under pressure for operation of an inertia brake.